July 16, 1929.　　　J. SACHS　　　1,721,493

INCLOSED FUSED SWITCH

Filed Jan. 13, 1922　　　3 Sheets-Sheet 1

INVENTOR
Joseph Sachs
BY
ATTORNEY

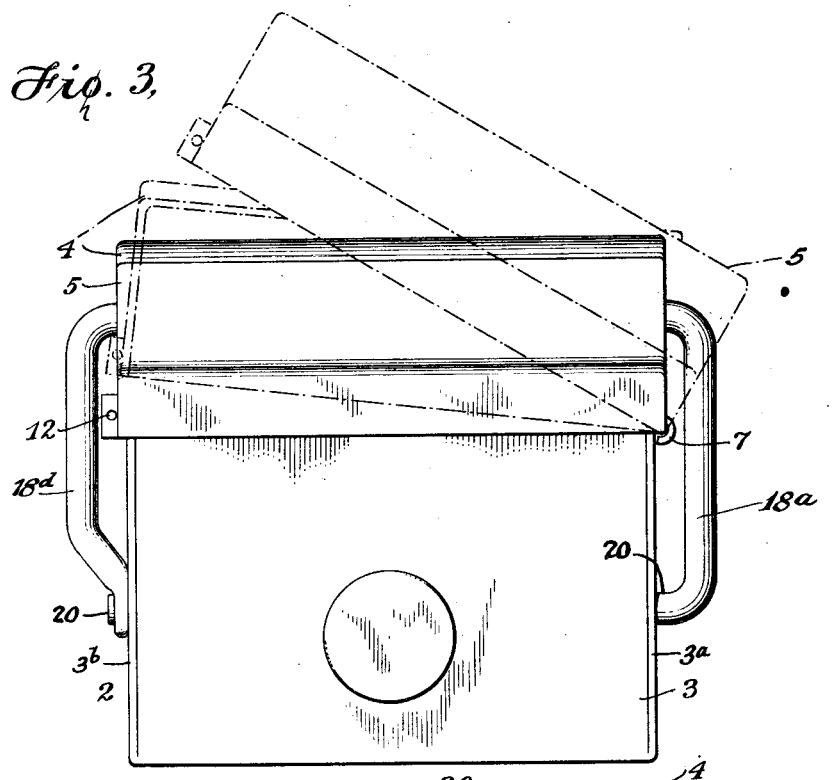
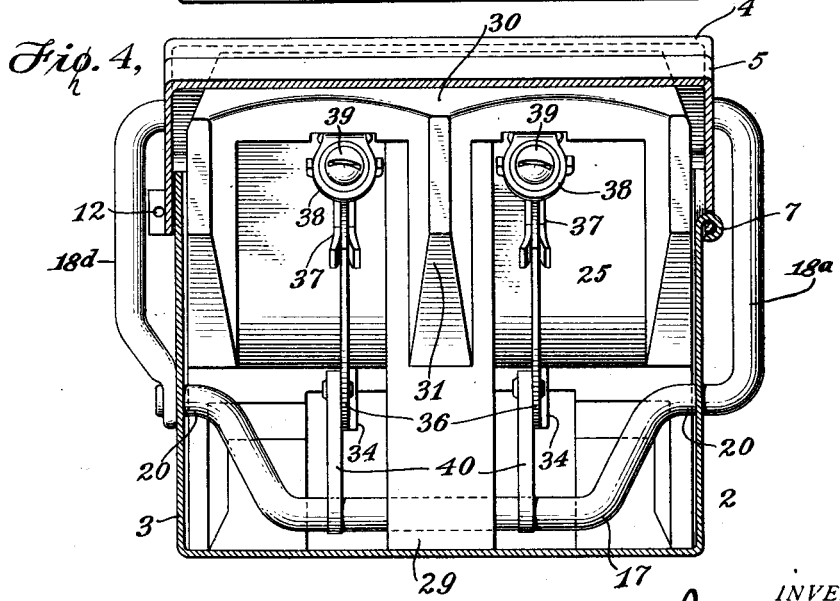

July 16, 1929.  J. SACHS  1,721,493
INCLOSED FUSED SWITCH
Filed Jan. 13, 1922  3 Sheets-Sheet 3
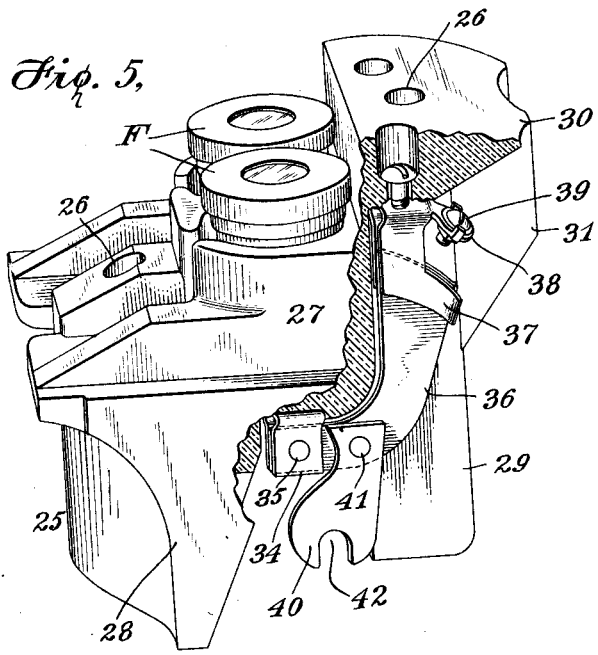
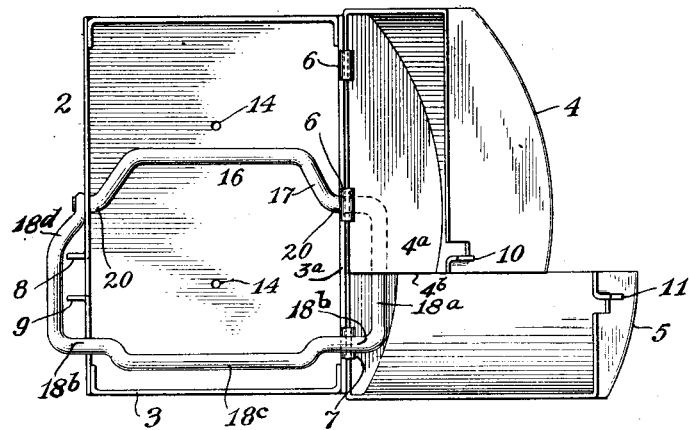

Patented July 16, 1929.

1,721,493

UNITED STATES PATENT OFFICE.

JOSEPH SACHS, OF WEST HARTFORD, CONNECTICUT.

INCLOSED FUSED SWITCH.

Application filed January 13, 1922. Serial No. 528,934.

This invention relates to encased switches, especially fused switches, and provides a compact structure in which the manipulator of the fuses is safe-guarded against contact with any live parts of the device and in which various other advantages are obtained as will hereinafter be made apparent. This application is a refile of my prior application, Ser. No. 200,012, filed November 3, 1917 on the same subject matter.

In the drawings forming part of this specification I have shown in detail one embodiment of the invention although I do not restrict myself to such disclosure and may depart therefrom in many respects within the scope of the invention as defined by the appended claims as will later be apparent.

Fig. 3 is an end elevation of the device shown in Fig. 1, taken from the right hand end, the dot-and-dash lines indicating positions assumed by the two parts of the cover of the casing when opened.

Fig. 4 is a cross section on the line IV—IV of Fig. 2, looking in the direction of the arrow.

Fig. 5 is a perspective view of the switch base or support and the switch clips, blades and other parts mounted thereon, a part of the front wall of the base being broken away to show the switch parts in better detail.

Fig. 6 is a top plan view on a smaller scale of the casing or housing and the switch operating or actuating member and handle mounted therein with the two parts of the cover of the casing opened wide and the actuating handle in the off position. In this view the switch base or support and the parts carried thereby have been omitted to more clearly show the interior of the casing.

Figure 1:
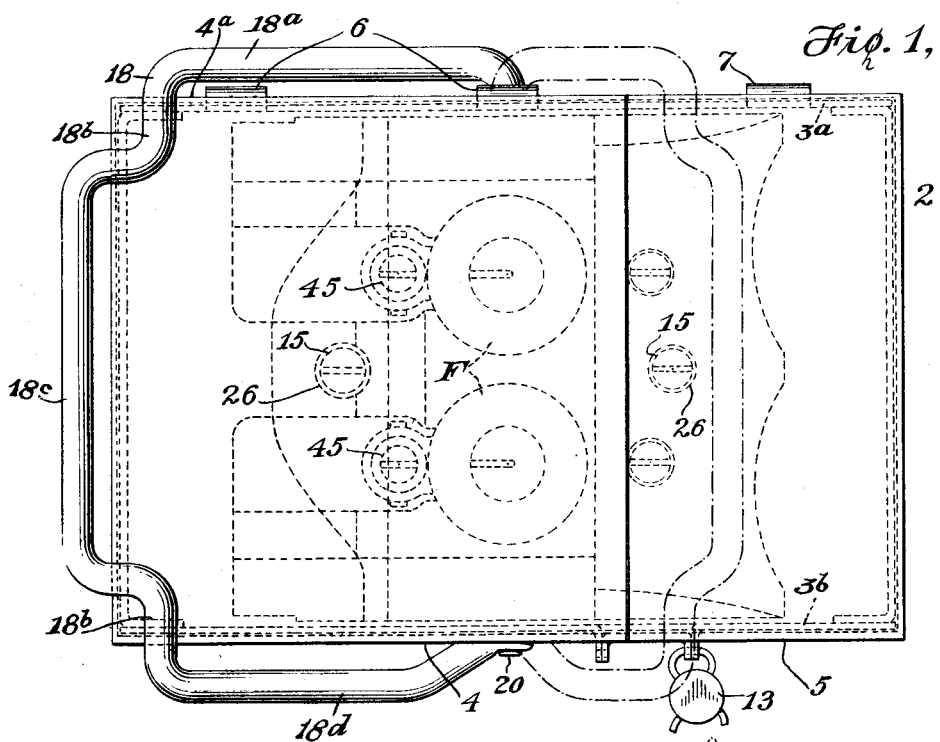
Figure 1 is a plan view of my encased switch with the cover of the casing or housing closed and the switch actuating handle in the on position.

In describing the device that portion thereof shown at the right in Fig. 1 will be regarded as being at the bottom, and such expressions as "vertical", "horizontal", "lateral", and the like will be used with the understanding that the device is normally so positioned. It will nevertheless be understood that I do not thereby limit myself to the location of the device in any one position.

The complete appliance comprises broadly two units, a casing or box 2 with a switch operating or actuating handle, and a fused switch having a suitable support on which are mounted in the proper relationship the switch and cut-out or fuse-receiving parts. The switch and cut-out block is preferably removable as a complete self-contained unit from its casing or box and is preferably so arranged that its placement in the box or casing in proper relationship with the switch actuating handle can be quickly accomplished.

The fuse contacts and the switch parts are spaced from each other within the box so that provision can be made for permitting access to the fuse contacts while preventing access to the switch contacts. The said fuse contacts and switch parts may be variously positioned in order to obtain the desired result but in order to illustrate the invention I have shown them as mounted on opposite faces of an insulating support or base which is indicated as an entirety by 25. The base may be constructed and positioned as shown so as to divide the box into two separate compartments A and B. As illustrated there are two pairs of fuse contacts adapted to receive screw plug fuses F, although I do not necessarily limit myself to fuses of this particular type; and there are two switches which are of the knife blade type although I do not so limit myself. The exact details of the construction and mounting of the fuse contacts and of the switches can be widely varied, but when the base divides the box into two compartments the fuse contacts are in one compartment such as the compartment A and the switches are in the other compartment, such as the compartment B. The details of the specific construction and mounting of the fuse contacts and switches as shown in the drawings will be hereinafter more fully described.

The box comprises a body 3, which is rectangular although this is not always necessary, and said body is composed of a back, two side walls 3ª and 3ᵇ and two end walls, and is preferably made of metal such as sheet steel. For operating the switch members, whether these be of the exact type illustrated or of some other type, I provide an operating means which includes a handle located on the exterior of the box and having at least one part thereof immediately adjacent one side wall of the box and movable in a plane substantially parallel thereto. I have shown a handle 18 having a part 18ª which is adjacent the side wall 3ª of the box and which is movable in a plane parallel thereto, the said handle being pivoted for movement about an axis perpendicular to the side wall 3ª.

The box is provided with an openable front cover which serves when closed to prevent access to the switch or switches while permitting access to the fuse contacts. When the box is divided into two compartments by means such as the insulating base 25 the switch cover can be arranged as shown at 5 in the drawings so as to cover the opening into the compartment B between the said base 25 and the corresponding end of the cabinet. The character of the opening movement of the cover 5 can be varied but I prefer to mount the cover for pivotal movement. As illustrated it is pivotally mounted by means of a hinge 7 for movement about a vertical axis.

In addition to the openable cover for the switches I provide a front cover means which normally serves to prevent access to the fuse contacts and which is movable independently of the aforesaid switch cover to permit such access. In accordance with one phase of the invention the said cover means includes a laterally movable portion which, when the cover means is in the position for permitting access to the fuses, is located in a projecting position at one side of the box and in the path of movement of the handle part 18ª. In obtaining access to the fuse contacts the normal procedure is to first move the switch handle to open the switches and to then move the cover means for the fuses to expose the fuses. As already stated, whenever the said cover means is in access permitting position the said laterally movable portion thereof is located in the path of movement of the side part of the handle and therefore serves to prevent movement of the handle to switch closing position.

The details of construction of the fuse cover means may be widely varied but I have illustrated a fuse cover means which comprises a sidewise opening cover. When a sidewise opening cover is provided the said cover has a portion which partakes directly of the sidewise movement so as to project or be located in the path of movement of the said side part of the handle for the purpose already described. Different types of sidewise movement may be provided but I have illustrated a cover constructed and arranged for a sidewise pivotal movement.

When the box is divided into two compartments by a means such as the base 25 the sidewise openable cover may be of the type shown at 4 in the drawings, being arranged to cover the opening into the compartment A between the base 25 and the corresponding end of the box body 2. The cover 4 is hinged at 6, 6 to the side wall 3ª for movement about a vertical axis. In order that the cover may have a portion which is laterally movable as already described it is provided at the hinge side with a relatively deep flange 4ª which extends rearward from the front of the cover. The hinge connections at 6, 6 are near the rear edge of the flange 4ª the result being that upon the opening of the cover the flanged portion 4ª thereof moves laterally into the path of movement of the side part 18ª of the handle. Thus with the cover open as shown in Fig. 6 the laterally movable or projecting portion 4ª thereof interferes with the side part 18ª of the handle to prevent movement of the handle from switch opening position to switch closing position. It will be observed that the laterally movable portion of the fuse cover means, in this case the flanged portion 4ª, terminates at a horizontal edge adjacent the switch opening position of the handle. As shown the switch opening position is the lowermost position and the said cover portion terminates with its horizontal bottom edge 4ᵇ immediately above the said position of the handle.

In addition to providing means for preventing the movement of the switch handle from switch opening position to switch closing position when the fuse cover means is in access permitting position, I preferably also provide means whereby the switch handle when in switch closing position prevents the movement of the fuse cover means to access permitting position. The last said means may be varied as to details but when there is a cover such as 4 pivoted for sidewise opening movement I may provide for this purpose portions 18ᵇ, 18ᵇ of the handle 18 which extend laterally and which are so positioned as to be adapted to directly engage the outer face 4ᶜ of the cover to prevent opening movement. Preferably when the handle is provided with the said laterally extending portions 18ᵇ, 18ᵇ the front face 4ᶜ of the cover is curved so as to lie adjacent the path of movement of the said portions 18ᵇ, 18ᵇ of the handle, the result being that the said handle portions 18ᵇ, 18ᵇ cooperate with the cover to hold it closed or substantially closed for any position of the handle except positions approximating the position shown by dot-and-dash lines in Figs. 1 and 2 with the switch fully open.

When the cover 4 is provided with a curved front face as shown the cover 5 is preferably also provided with a similar curved front face in register therewith so that the said portions 18ᵇ, 18ᵇ of the handle serve to prevent any considerable opening movement of the cover 5 when the handle is in switch opening position. The pivotal axes of the two covers are preferably coincident.

Having now described the basic features of the invention I will now proceed with a more detailed description of the specific embodiment of the invention which has been selected for the purposes of exemplifying it. When the cover parts are closed, it may be desirable to seal them, so that access to the interior of the casing or box is entirely prevented unless a seal or seals are broken. Such would be the case when it is intended that the fuses should only be manipulated by especially authorized persons and that the ordinary operator should merely have access to the switch operating handle on the exterior of the box and not to the interior. Usually, however, where it is desired that access be had to the interior of the casing for the replacement or manipulation of fuses only, then only one part of the cover will be sealed, while the other part will be left unsealed, so as to permit of its being opened when necessary for the purpose above described. The sectionalizing of the cover is provided in order that certain parts mounted on the switch and cut-out block may be made inaccessible by the sealing of that section of the cover through the manipulation of which, access may be had to those parts. It will be clear that while either one or both sections of the cover will under normal conditions of usage, where it is intended that the device function to its best advantage, be sealed, yet the structure is so arranged that the sealing of the cover in whole or in part is not essential to the proper circuit controlling functioning of the device, but when so left unsealed the complete safety functioning of the device is not obtained. The sealing means is constituted of the projections or ears 8 and 9 on the box body which as shown are adjacent. The projection or ear 8 cooperates with a complemental projection or ear 10 on the cover section 4 and near the cover section 5. The latter is furnished at its free end and adjacent the cover section 4 with a projection or ear 11, a counterpart of the projection or ear 10. The several projections or ears 8, 9, 10 and 11 are each provided with a perforation 12. When the cover is closed on the body 3 as shown by full lines in Fig. 3, the perforations 12 will register so that a seal as 13 (Fig. 1) may be inserted as will be understood. When it is desired that both sections of the cover be sealed, then the seal wire may be extended through the holes 12 in both sealing means so that one seal may serve for both sections.

Figure 2:
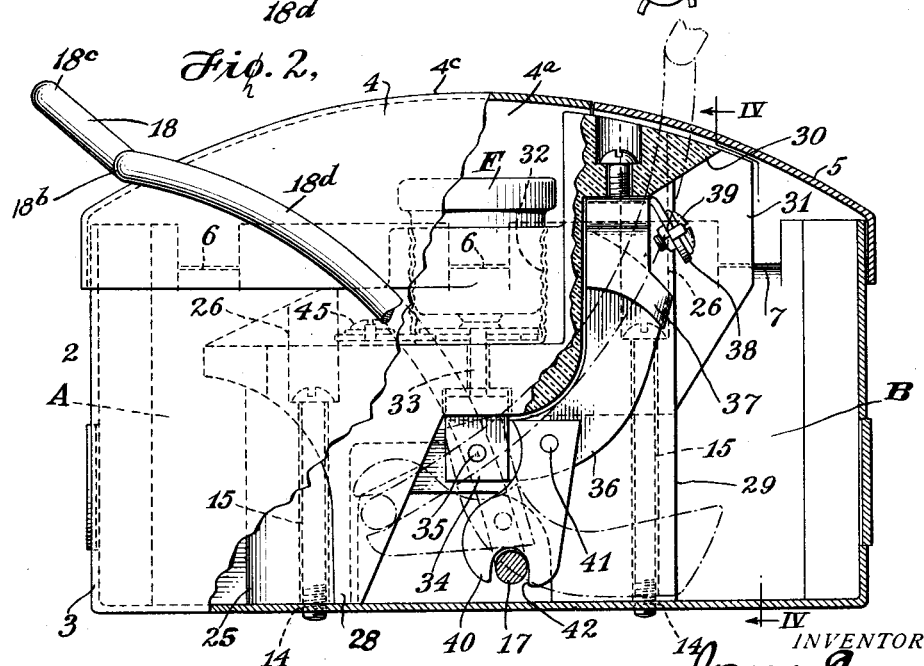
Fig. 2 is a side elevation of the device shown in Fig. 1 with a part of the side of the casing or housing and its cover broken away to show the interior switch supporting base and the parts mounted thereon, a part of the insulating base being broken away to show the contact clips, switch blades and other switch parts more in detail.

The switch operating spindle 16 may be organized with the other parts in various ways, but it is desirable that it be supported by the casing or box. It is made preferably of round metal rod and as shown it is bent to the shape of a complete annulus or loop. The complete spindle may be said to comprise two portions, the interior or switch operating portion 17 and the exterior handle and cover locking portion. The switch operating portion 17 of the spindle is provided with pivot or journal portions 20 which fit holes in the side walls of the box body 3. The switch operating portion extends from the journal portions in a bail-like or yoke-like form as shown. The side part $18^a$ of the handle extends from the corresponding pivot portion 20 toward and slightly beyond the cover of the box and in proximity to the side wall $5^a$ of the box body and the flange $4^a$ of the cover, as clearly shown in Figs. 1, 2, 3, 4 and 6. The parts $18^b$, $18^b$ extend laterally from the part $18^a$ as already described and a part $18^c$ between them is projected slightly outwardly so as to leave room enough for the fingers as shown in Figs. 1 and 2. As shown the handle also has a part $18^d$ at the side opposite the part $18^a$ which extends inward and is also pivoted to the box body. This pivoting may be effected by providing the said part $18^d$ with an enlargement having a hole to receive the end of the corresponding pivot portion 20.

The particular device herein shown and described is a two-pole safety cut-out switch. A switching member with its complemental parts and a cut-out member and its complemental parts, are therefore, provided for each of the two legs of the circuit. As already stated, these switch and cut-out members and associated parts are mounted on a switch and cut-out base or block 25, and this base or block may assume various shapes or designs according to preference. The principal feature of this block, however, is that the switching parts are mounted on one side, while the cut-out parts are mounted on the opposite side. Preferably the cut-out parts are mounted on the upper or outwardly facing side of the base, opposite from the foundation on which the box or block is mounted, and the base of the block is so formed and constructed that the switching parts are protected by the structure of the block so as to provide access to the fuses or fuse receptacles without danger of coming in contact with the switch parts, this protection being supplemented by the arrangement of the section 5 of the cover as already described.

The base or block 25 is held in place in the present case by screws 15 which screws occupy the perforations in the block marked 26. The block comprises a body portion 27 provided with leg or feet portions 28 and 29, spaced from each other and seated on the back wall of the box. The leg 28 in the present case is a wide leg curved on one side and occupying substantially the full width of the box. The leg 29, is narrower than the leg 28. The body 27 has a projecting ledge portion 30 which is reinforced by the angle flange 31 which latter serves also as a separating partition or barrier between the two poles of the switch mechanism. As shown in the perspective view of Fig. 5, one of the switching mechanisms for one pole appears in front of this partition 31, while the mechanism for the other pole will be understood to be on the other side or behind it. The switch and cutout parts are mounted on the base 25 which, as will be understood, is made of insulating material such as porcelain in which the various holes, recesses, walls, etc., are molded.

The upper side of the body 27 is molded or formed to receive the metallic contact member of Edison type fuse receptacle, 32, this type being shown by way of example. Fuse plugs F are shown in position in these receptacles. The central contact of the Edison plug receptacle extends downwardly through the body of the block, as at 33, and is screwed into the hinge clip 34. To this hinge clip which is of the usual knife-blade hinge clip type, I pivot at 35 a switch blade or member 36 (Fig. 5 for example), which switching member is cut from flat stock with a curved contour as shown. The free end of the switching member 36 contacts with and is received between the lips of the rupture end clip 37, which is mounted on the under side of the ledge 30 and held in place by suitable screw or other means as shown. This rupture end clip is generally similar to the clips commonly used in knife-blade switches and is provided at its base with a projection 38 carrying a wire-connector or binding screw 39. Attached to the switching member or blade 36 near its pivot end is an insulating coupling hook 40 riveted or otherwise firmly secured to the blade as shown at 41 and provided with a slot or notch 42, by means of which it is connected or coupled to the operating spindle 16. It will be noted that by reason of the location of the pivots 35 of the connector blades 36 and of the rupture clips 37, respectively at different distances from the back wall of the box, the said blades are permitted to swing through substantially a ninety degree arc in making the break and thus make a longer gap than would be possible in the same size of box if the pivots and clips were at the same distance from the back wall and this arrangement therefore promotes the compactness of the apparatus. It will be understood that the switch parts including the switching member, its clips and coupler may be of the same design for the other pole or poles of the device.

The switch and cut-out block as thus equipped constitutes an assembled unitary structure which can be inserted in and removed from the box as a unit, this manipulation being facilitated by the notch connection of the couplers to the bail member 17 of the spindle. It is merely necessary to place the block into the box so that the said bail member 17 is received into the slots 42 of each coupler. In this position the couplers 40 embrace the cross member so that an oscillating movement of the spindle 16 will produce corresponding movement of the switch blades 36 turning them on their pivots 35. With the block so mounted in its proper location and held by the screws so as to produce proper cooperative relation between the handle and the switch blades the cover may now be closed. First the cover section 4 is closed, after which the handle is moved over this section as indicated by the full lines in Figs. 1 and 2. When this has been done the section 5 may be closed, and if desired sealed.

It will be noted that with the block in position a definite relation exists between the several parts including the handle. When the complete device is to be installed, it will be necessary to connect to the device the incoming and outgoing wires. In the organization shown the rupture end clips 37 are connected by means of their binding screws 39 with the incoming or live wires, while the outgoing wires or the wires extending to the load, are connected to the binding screws 45 which are of the usual wire-connecting type such as used on ordinary Edison plug cut-out receptacles. This requires that the auxiliary section 5 of the cover be opened in order to obtain access to the live end connections, after which it may be closed and sealed if desired.

The cover, as a whole, whether made of sections or not, is curved or domed as already described and the upper side of the ledge 30 may also be curved in conformity, if desired, and approaches rather closely to the underside of the cover so as to make access difficult to the live parts, when the cover is sectional and the fuse covering section is opened. Furthermore, it will be noted that while at its other end there is a space between the block and the inside end wall of the box, yet access from this end is prevented by reason of the fact that the wide foot 28 extends clear across from side wall to side wall of the box as already mentioned.

It will be perceived that the box is provided with knockouts for the entrance of the circuit wires through the usual conduits or otherwise. The pulling in of the wires into the box through conduit may be accomplished with the block removed if desired. The auxiliary cover section 5 being opened, it is now easily possible with the wires pulled into the box to connect their ends to the live clip or rupture end clip. After this has been done, the auxiliary section 5 of the cover may be closed and sealed as already described. It is assumed that the outgoing or load wires have also been connected to the connections 45 in the same way which are accessible by opening the section 4 of the cover.

With the complete device connected as described, it is now ready for operation as a complete encased safety cut-out switch in which the switch is manipulable from the exterior of the cabinet without in any way opening the cover, and when it is necessary to renew or manipulate the fuses for any reason, this can only be done by first opening the switch and disconnecting all of the fuse-holding or receiving parts from the live wires.

I claim:

1. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, and additional front cover means normally serving to prevent access to the fuse contacts and movable independently of the aforesaid cover to permit such access, the said cover means including a laterally movable portion which, whenever the first said cover is closed and the said cover means is in access permitting position, is located in the path of movement of the said side part of the handle so that it directly obstructs movement of the handle from switch opening position to switch closing position.

2. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, and additional front cover means normally serving to prevent access to the fuse contacts and movable independently of the aforesaid cover to permit such access, the said cover means including a laterally movable portion which, whenever the first said cover is closed and the said cover means is in access permitting position, is located in the path of movement of the said side part of the handle with a horizontal edge of the said portion directly obstructing movement of the handle from switch opening position to switch closing position.

3. A fused switch comprising in combination, an inclosing box, fuse contacts in the box, a switch in the box, an openable front cover serving when closed to prevent access to the switch while permitting access to the fuse contacts, additional front cover means normally serving to prevent access to the fuse contacts and movable independently of the first said cover to permit such access, the said cover means including a laterally movable portion which projects at one side of the box whenever the first said cover is closed and the said cover means is in access permitting position, and an exterior switch operating handle having at least a part thereof adjacent the wall of the box at the last said side thereof and movable from switch opening position to switch closing position in a path which is directly obstructed by the said portion of the fuse cover means when projecting as aforesaid, the said handle when in switch closing position directly engaging a part of the said fuse cover means so as to prevent movement thereof to access permitting position.

4. A fused switch comprising in combination, an inclosing box, an insulating base in the box, fuse receiving contacts on one face of the base, a switch adjacent another face of the base, an exterior switch operating handle having at least one part thereof adjacent a side wall of the box and movable in a plane substantially parallel thereto, an openable front cover serving when closed to prevent access to the switch while permitting access to the fuse contacts, and additional front cover means normally serving to prevent access to the fuse contacts and movable independently of the aforesaid cover to permit such access, the said cover means including a laterally movable portion which, whenever the first said cover is closed and the said cover means is in access permitting position, is located in the path of movement of the said side part of the handle so that it directly obstructs movement of the handle from switch opening position to switch closing position.

5. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, the said cover being freely movable in a path which is unobstructed by the handle when the latter is in switch closing position, and additional front cover means normally serving to prevent access to the fuse contacts and movable independently of the aforesaid cover to permit such access, the said cover means including a laterally movable portion which, whenever the first said cover is closed and the said cover means is in access permitting position, is located in the path of movement of the said side part of the handle so that it directly obstructs movement of the handle from switch opening position to switch closing position.

6. A fused switch comprising in combination, an inclosing box, fuse contacts in the box, a switch in the box, an openable front cover serving when closed to prevent access to the switch while permitting access to the fuse contacts, additional front cover means normally serving to prevent access to the fuse contacts and movable independently of the first said cover to permit such access, the said cover means including a laterally movable portion which projects at one side of the box whenever the first said cover is closed and the said cover means is in access permitting position, and an exterior switch operating handle having at least a part thereof adjacent the wall of the box at the last said side thereof and movable from switch opening position to switch closing position in a path which is directly obstructed by the said portion of the fuse cover means when projecting as aforesaid, the said handle when in switch closing position directly engaging a part of the said fuse cover means so as to prevent movement thereof to access permitting position and being out of the path of movement of the first said cover so that the latter can be freely opened notwithstanding the engagement of the handle with the said fuse cover means.

7. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, and an additional front cover normally serving to prevent access to the fuse contacts and openable independently of the first said cover to permit such access, the said cover having a portion which, whenever the first said cover is closed and the second said cover is open, is located in the path of movement of the said side part of the handle so that it directly obstructs movement of the handle from switch opening position to switch closing position.

8. A fused switch comprising in combination, an inclosing box, fuse contacts in the box, a switch in the box, an openable front cover serving when closed to prevent access to the switch while permitting access to the fuse contacts, an additional front cover normally serving to prevent access to the fuse contacts and openable independently of the first said cover to permit such access, the said cover having a portion which projects at one side of the box whenever the first said cover is closed and the second said cover is open, and an exterior switch operating handle having at least a part thereof adjacent the wall of the box at the last said side thereof and movable from switch opening position to switch closing position in a path which is directly obstructed by the said portion of the fuse cover when projecting as aforesaid, the said handle when in switch closing position directly engaging a part of the said fuse cover so as to prevent movement thereof to access permitting position.

9. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, the said cover being freely movable in a path which is unobstructed by the handle when the latter is in switch closing position, and an additional front cover normally serving to prevent access to the fuse contacts and openable independently of the first said cover to permit such access, the said cover having a portion which, whenever the first said cover is closed and the second said cover is open, is located in the path of movement of the said side part of the handle so that it directly obstructs movement of the handle from switch opening position to switch closing position.

10. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, and an additional front cover normally serving to prevent access to the said fuse contacts and having a deep flange at the side adjacent the handle, the said cover being vertically hinged to the box body near the rear edge of the said flange so that upon opening of the cover the flanged portion thereof is located in the path of movement of the said side part of the handle and thus directly obstructs movement of the handle from switch opening position to switch closing position.

11. A fused switch comprising in combination, an inclosing box, an insulating base in the box, fuse receiving contacts on one face of the base, a switch adjacent another face of the base, an exterior switch operating handle having at least one part thereof adjacent a side wall of the box and movable in a plane substantially parallel thereto, an openable front cover serving when closed to prevent access to the switch while permitting access to the fuse contacts, and an additional front cover normally serving to prevent access to the said fuse contacts and having a deep flange at the side adjacent the handle, the said cover being vertically hinged to the box body near the rear edge of the said flange so that upon opening of the cover the flanged portion thereof is located in the path of movement of the said side part of the handle and thus directly obstructs movement of the handle from switch opening position to switch closing position.

12. A fused switch comprising in combination, an inclosing box, fuse contacts in the box, a switch in the box, an openable front cover serving when closed to prevent access to the switch while permitting access to the fuse contacts, and an additional front cover normally serving to prevent access to the said fuse contacts and having a deep rearward extending flange at the side adjacent the handle, the said cover being vertically hinged to the box body near the rear edge of the said flange so that upon opening of the cover the flanged portion thereof projects at one side of the box, and an exterior switch operating handle having at least a part thereof adjacent the wall of the box at the last said side thereof and movable from switch closing position to switch opening position in a path which is directly obstructed by the said portion of the fuse cover when projecting as aforesaid, the said handle when in switch closing position directly engaging a part of the said fuse cover so as to prevent movement thereof to access permitting position.

13. A fused switch comprising in combination, an inclosing box, fuse contacts in the box, a switch in the box, an exterior switch operating handle having at least one part thereof adjacent a side wall of the box and movable in a plane substantially parallel thereto, an openable front cover serving when closed to prevent access to the switch while permitting access to the fuse contacts, the said cover being freely movable in a path which is unobstructed by the handle when the latter is in switch closing position, and an additional front cover normally serving to prevent access to the said fuse contacts and having a deep rearward extending flange at the side adjacent the handle, the said cover being vertically hinged to the box body near the rear edge of the said flange so that upon opening of the cover the flanged portion thereof is located in the path of movement of the said side part of the handle and thus directly obstructs movement of the handle from switch opening position to switch closing position.

14. An inclosed fused switch comprising a box body containing a base, a fuse on the outer side thereof, switch mechanism on the inner side thereof, a cover for the fuse hinged to the box side wall, a cover for the service side parts hinged to the same side wall, and a switch-operating handle adapted to obstruct opening of the fuse cover.

15. A fused switch comprising a box, a base or block therein, a fuse and switch mechanism carried by the block, a cover section normally covering the fuse, another cover section normally guarding the service end and live contacts of the switch mechanism and an exterior switch operating handle obstructing the opening of one, but not of the other, of said sections in one position and the opening of the other, but not of the one, section in another position.

16. An encased fused switch comprising a box body, an insulating base block having a fuse-receiving means on one face and a switch connector on another face, said block being secured to the back wall of the box and extending therefrom to the open side or front of the box body, a sectional cover for the box comprising one section which opens to provide access to the fuse-holding side of said block and another section which meets said block between its said faces and thereby obstructs access to the switch connector.

17. An encased fused switch comprising a box body, an insulating base block having a fuse-receiving means on one face and a switch connector on another face, said block being secured to the back wall of the box and extending therefrom to the open side or front of the box body, a sectional cover for the box comprising one section which opens to provide access to the fuse-holding side of said block and another section which meets said block between its said faces and thereby obstructs access to the switch connector and an exterior operating crank handle for said connector arranged to obstruct opening of the fuse-inclosing cover section when the connector is closed.

18. A fused switch comprising a box having a cover, a base block secured with its rear face against the back-wall of the box and extending from the back wall to a point adjacent the box cover, fuse-receiving means mounted on the exposed side of the block, switch mechanism disposed on the opposite side and including pivoted connector members and cooperating rupture clips, the pivots of said members and said rupture clips being located at different distances from the back wall of the box, and an external operating handle for said switch mechanism adapted to obstruct opening of the cover when the switch mechanism is closed.

In testimony whereof, I have signed this specification.

JOSEPH SACHS.